Figure 1:
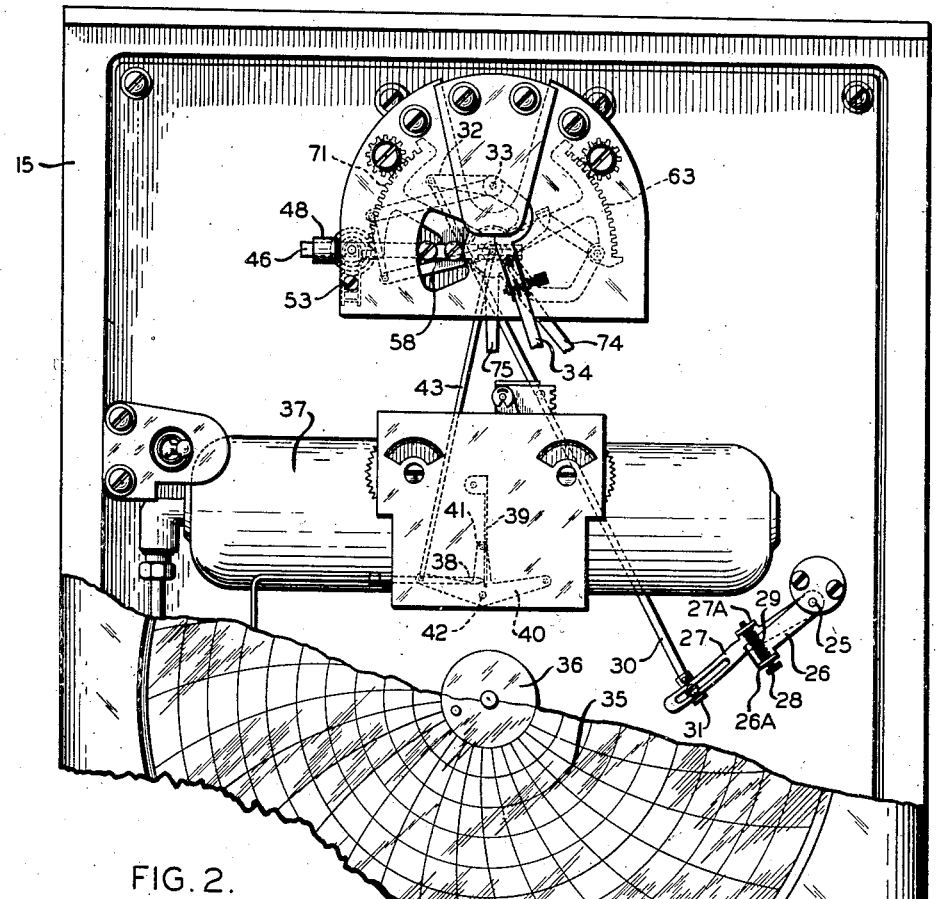

Oct. 2, 1945. L. GESS ET AL 2,386,108
MEASURING INSTRUMENT
Filed Oct. 7, 1942 2 Sheets-Sheet 1

INVENTOR.
LOUIS GESS.
EDWIN C. BURDICK.
BY C. B. Spangenberg
ATTORNEY.

Oct. 2, 1945. L. GESS ET AL 2,386,108
MEASURING INSTRUMENT
Filed Oct. 7, 1942 2 Sheets-Sheet 2
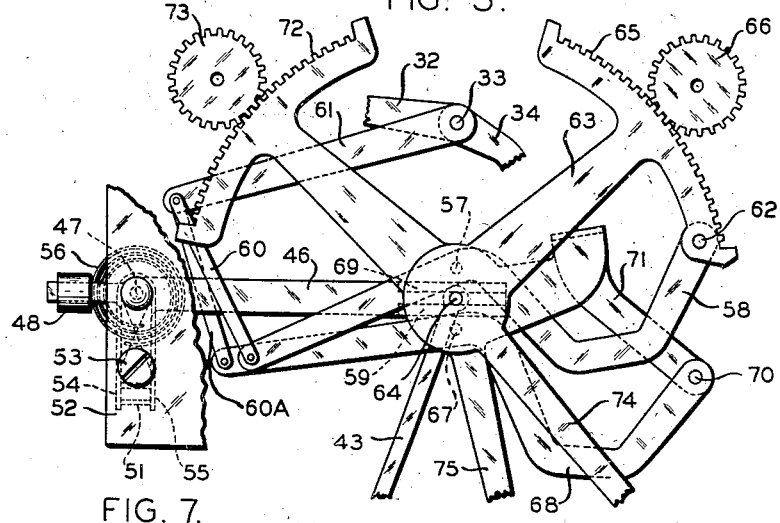
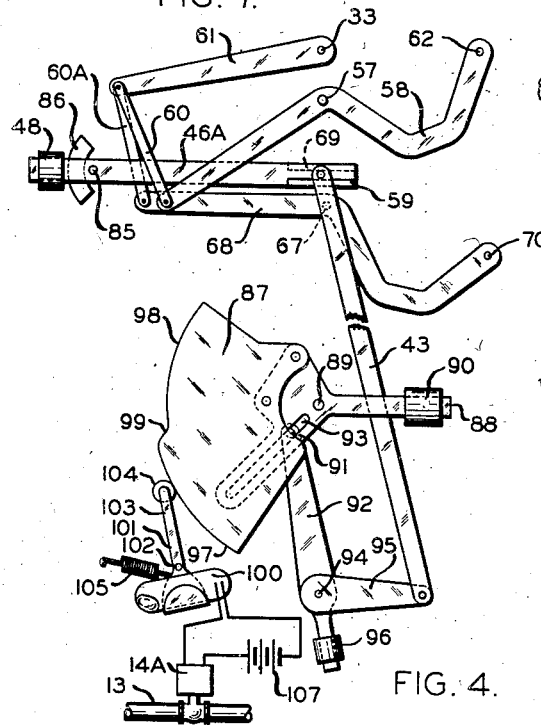
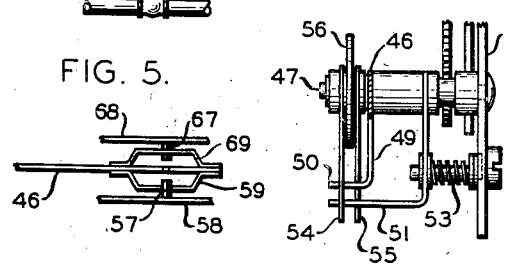
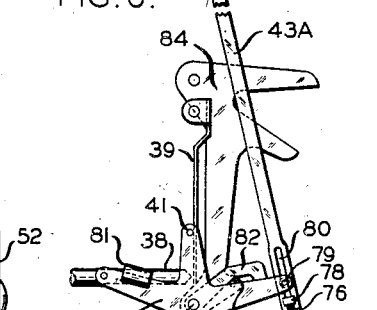
INVENTOR.
LOUIS GESS.
EDWIN C. BURDICK.
BY
ATTORNEY.

Patented Oct. 2, 1945

2,386,108

UNITED STATES PATENT OFFICE 2,386,108

MEASURING INSTRUMENT

Louis Gess, Jenkintown, and Edwin C. Burdick, Philadelphia, Pa., assignors to The Brown Instrument Company, Philadelphia, Pa., a corporation of Pennsylvania Application October 7, 1942, Serial No. 461,172

14 Claims. (Cl. 137—68)

The present invention relates to control instruments and, more particularly, to control instruments having provisions for obtaining an inactive or an overlapping neutral zone in their range of operation.

It is an object of this invention to provide an instrument which will control the value of some condition such, for example, as liquid level, temperature, pressure or flow when said condition reaches a value that is above or below the limits of a zone of adjustable width in the range of the control instrument.

It is a further object of the invention to provide a control instrument which has an inactive neutral zone which may be made of different widths and located in different portions of the range of the instrument. It is a further object of the invention to produce a control instrument which is provided with means wherein the control action obtained as the instrument operates through a neutral zone may be in one direction or an opposite direction depending upon whether the instrument is operating up or down scale.

In the operation of one form of the invention the instrument tends to maintain the controlling device, such as a valve, in a median position and to adjust the controlling device in one direction or an opposite direction when the condition being controlled reaches one limit or the opposite limit of a neutral zone within the range of the instrument. In another embodiment, the instrument will adjust the controlling device in one direction as the condition passes through one limit of a neutral zone when it is changing in one direction and will adjust the controlling device in the opposite direction as the condition passes through the opposite limit of the neutral zone when the condition is varying in the opposite direction. The last mentioned embodiment therefore gives one control effect as the condition is to one side of and is passing through the neutral zone in one direction and gives an opposite control effect when the condition is on the opposite side of the neutral zone or is passing through it in the opposite direction.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which we have illustrated and described a preferred embodiment of the invention. The instrument is described herein as controlling the liquid level in a tank as an example only, as it will be readily apparent to those skilled in the art that other conditions may also be controlled.

Figure 2:
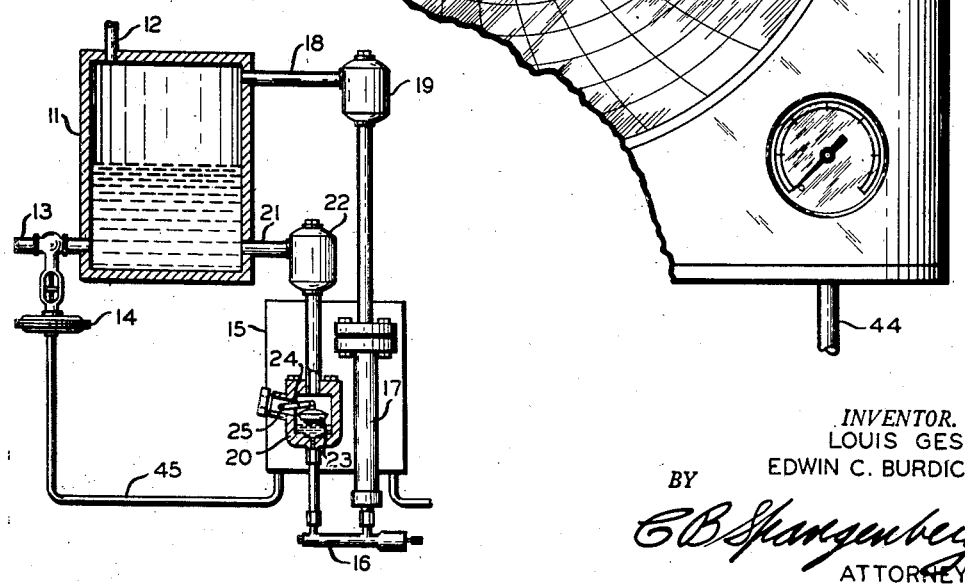

In the drawings:

Figure 1 is a front view of the control instrument, with certain parts broken away, Figure 2 is a view showing how the liquid level in the tank is measured, Figure 3 is a view of the control point setting levers, Figure 4 is a view of a portion of Figure 3, from the left of that figure, Figure 5 is a top view of a portion of the actuating lever, Figure 6 is a view of another embodiment of the invention, Figure 7 is a view of another embodiment of the invention actuating an electric control, and Figure 8 is a view of still another embodiment of the invention combining features of Figure 1 and of Figure 7.

Referring first to Figure 2, there is shown a tank 11 in which liquid enters through a pipe 12, and leaves through a pipe 13 at a rate which is controlled by a valve 14 in the pipe, which valve is controlled in accordance with the level of the liquid in the tank. The valve 14 is a pneumatic valve of the type which is opened by a spring and is closed by the application of an air pressure to a diaphragm in the valve which opposes the action of the spring. The air pressure applied to the diaphragm in the valve is adjusted by a control instrument 15.

The level of the liquid in the tank 11 is measured by a differential pressure measuring instrument 16 that is attached to the back of the casing 15 and which, in this case, takes the form of a U-tube manometer having one leg 17 that is connected by means of a pipe 18 with the tank at a point equal to the maximum level. This leg has at its upper end a seal pot 19 to serve as a reservoir for a sealing liquid which may be placed between the liquid in the tank and the measuring liquid used in the manometer. The second leg 20 of the manometer is connected by means of a pipe 21 with the tank 11 at a point equal to the minimum level of the liquid. A seal pot 22 is also placed between the upper end of this leg and the pipe 21. The second leg 20 of the manometer is enlarged, and has a float 23 in it which is connected by means of a lever 24 with a shaft 25, to rotate the shaft as a level of the float changes.

In the operation of measuring the level of the liquid in the tank 11, some suitable measuring liquid, such as mercury, is placed in the legs and cross-piece of the manometer above which is a suitable sealing liquid to protect the mercury from the liquid in the tank. Each of the legs in the manometer above the mercury is filled with this sealing liquid to a level in the seals so that it will not quite reach the connecting pipes 18 and 21. If the liquid in the tank is not corrosive, and will not have any effect on the mercury, the sealing liquid may be done away with, and the legs of the manometer filled with the same liquid that is in the tank. When the tank is full of liquid up to the pipe 18, the level of the mercury in the two legs 17 and 20 of the manometer will be even, with the float 23 in its lowest position. As the level of the liquid in the tank is lowered, the weight of liquid applied to the mercury in the leg 17 of the manometer will become greater than that applied to the mercury in the leg 20 so that the mercury level in leg 20 will rise carrying the float with it, while the mercury level in leg 17 is lowered. Therefore, the position of the float 23 is a measure of the level of the liquid in the tank, and the higher the float, the lower the liquid level. As the float rises and falls, the shaft 25 is rotated so that the position of this shaft can also be taken as a measure of the liquid level.

The movement of the shaft 25 serves to operate an exhibiting element to exhibit the value of the liquid level. To this end, the end of the shaft 25 which extends into the instrument casing 15 has an arm 26 attached to it. Freely mounted on the end of the shaft 25 is a second arm 27 that is adjustably attached to the arm 26 for rotation therewith. In order to obtain this adjustment each of the arms 26 and 27 is provided with a turned up projection 26A and 27A, respectively, through which a screw 28 projects. This screw passes freely through the projection 26A and is threaded into the projection 27A so that as the screw is rotated, the arms will be brought nearer together or will be separated more. A spring 29 surrounds the screw in order to keep the arms 26 and 27 at their proper adjusted positions. The arm 27 is provided at its outer end with a slot to which the lower end of a link 30 is attached by means of a slider 31 that is adjustable along the length of the slot. The upper end of this link 31 is pivoted to an arm 32 which is in turn attached to a shaft 33. Also attached to the shaft 33 is an exhibiting element 34, which in this case is a pen arm that has upon its outer end a pen (not shown) that is adapted to make a record of the level of the liquid in the chamber 11 on a chart 35. The chart is driven at any suitable speed by means of a chart hub 36.

Movement of the shaft 25 also operates mechanism to control the opening of valve 14, and therefore the level of the liquid in the chamber. To this end, there is provided in the casing 15 a pneumatic control unit 37 which may well take the form of a Brown Air-O-Line unit of the type which is shown and described in Moore Patent 2,125,081, dated July 26, 1938. This control instrument includes a flapper valve 39 which is moved relative to a nozzle 38 by means of a pin 41 that is on a lever 40. This lever is moved around its pivot 42 to adjust the flapper relative to the nozzle by means of a link 43. As the flapper moves relative to the nozzle, more or less air is permitted to escape through the nozzle to act on the pneumatic mechanism in a well known manner to adjust the supply of air on the control valve 14. Air is supplied to the instrument 37 at a constant pressure through pipe 44 and from the instrument at a variable pressure dependent upon the level of the liquid in the chamber through a pipe 45 which extends between the instrument and the control valve.

The control unit 37 operates to normally maintain an intermediate pressure value upon the valve 14 to keep the valve partly open, but may operate to increase or decrease this pressure and thereby change the opening in the valve as the liquid level in the tank increases above and decreases below some mximum and minimum values. This normal value of the air pressure is maintained by resiliently holding the link 43 in a given median position. In order to accomplish this, the upper end of the link 43 is pivoted to the end of a control lever 46. This lever is pivoted at 47 and is provided on its left end with a counterweight 48 that is sufficient to balance the weight of the lever 46, the link 43 and the lever 40. The lever 46 is normally held in its neutral position by a spring on an arm 49 which is formed thereon, and which extends downwardly and rearwardly as at 50 (Figure 4). Also pivoted on the shaft 47, which is attached to a frame member 52, is a second arm 51 that has a portion parallel to the part 50 of the arm 49. This latter arm may be adjusted around the shaft 47 to various positions by means of an eccentric pin 53. A pair of arms 54 and 55 are freely pivoted on the shaft 47 and are adapted to engage opposite sides of the parts 50 and 51. These arms are resiliently pressed into engagement with the parts 50 and 51 by means of spring 56. The arrangement is such that the arms 54 and 55 are forced inwardly against the sides of parts 50 and 51 to maintain part 50 in line with part 51 and thereby hold the control lever 46 in its neutral position, which position can be adjusted by moving the arm 51 by the eccentric pin 53. The lever 46 may be moved clockwise or counter-clockwise in Figure 3 against the force of the arms 54 and 55, and the spring 56 at such times as the level of the liquid in the tank 11 moves above and below the limits for which the instrument has been set.

The control lever 46 is moved out of its neutral position in one direction by means of a pin 57 that projects from a differential lever 58 into the path of movement of a projection 59 formed on the lever, as shown best in Figure 5. This differential lever has its left end attached by a link 60 to the outer end of an arm 61 that is fastened on the shaft 33. The right end of the differential lever 58 is pivoted at 62 to a sector member 63. This member is pivoted on the frame member 52 at a point 64 that is concentric with the connection between link 43 and lever 46. The sector member is provided on its right end with gear teeth 65 which mesh with pinion 66.

The control lever 46 is moved in the other direction by means of a pin 67 that projects from a second differential lever 68 and engages the lower side of a projection 69 on the control lever. The left end of the differential lever 68 is attached by a link 60A to the end of lever 61 or a lever which is parallel to that lever which is also fastened to the shaft 33. The right end of lever 68 is pivoted at 70 to a member 71 that is also pivoted at 64. The left end of the member 71 is provided with gear teeth 72 that are engaged by a pinion 73. It is pointed out that the projection 59 which extends from the lever 46 has its upper face slightly below the center of this lever and is engaged by the pin 57. The projection 69 has its lower face slightly above the center of lever 46 and is engaged by the pin 67. This arangement permits an adjustment of the parts which will let pins 57 and 67 be concentric when the pins engage the upper and lower surfaces of projections 59 and 69 respectively.

In the operation of this instrument, the control lever 46 is normally maintained in its middle position as shown in the drawings by the spring 56 and the fingers 54 and 55. This means that the instrument will set up a pressure in line 45 of some intermediate value, and will keep the valve 14 partially open. If the level of the liquid increases the shaft 25 will be rotated counter-clockwise in Figure 1 to rotate the shaft 33 counter-clockwise and move the pen 34 outwardly along the chart. At the same time, arm 61 will be moved in a counter-clockwise direction to move both the links 60 and 60A and the differential levers 58 and 68 downwardly around their pivots 62 and 70 respectively. As long as the level of the liquid does not increase above some predetermined point, the pin 57 will not engage the projection 59 and therefore, air pressure applied to the valve 14 will not be changed. If, however, the level of the liquid increases above this predetermined point, the pin will engage the upper surface of projection 69 and move the lever 46 in a clockwise direction. This operates the control instrument 37 to increase the pressure applied through the pipe 45 to the valve 14 to open this valve more and permit a larger amount of liquid to escape through the pipe 13. If, on the other hand, the level of the liquid is decreased, nothing will happen until the pin 67 has been moved upwardly into engagement with the lower edge of projection 69. After this, any further movement of lever 68 will move the lever 46 in a counter-clockwise direction to cause the control instrument 37 to reduce the air pressure in pipe 45 and on valve 14. The valve will accordingly close to retard the flow through the pipe 14, and permit the liquid level to rise.

The predetermined limits through which the liquids in the tank may vary prior to any action of the control valve is determined by the separation of the pins 57 and 67. If these pins are moved until they engage the upper surface of projection 59, and the lower surface of projection 69 respectively any variation in the liquid level will cause an operation of the control instrument. This means that the level of the liquid in the tank will be controlled to some exact point. If, however, these pins are separated as shown, for example, in Figure 3, a dead space in the controller is obtained, and the liquid level may be varied between given limits before any action is produced on the valve. These limits are determined by adjusting the sector members 63 and 71 by means of the pinions 66 and 73 respectively. If, for example, the sector 63 is rotated in a counter-clockwise direction, the right end of lever 58 will be raised to raise the pin 57 and therefore increase the height to which the liquid in the tank 11 may rise before a control action is started. In a like manner, rotation of the pinion 73 will move the lever 71 around its pivot 64 to change the lower limit through which the liquid level in tank 11 may vary. The sector 63 is provided with a pointer 74 that indicates its position, and in cooperation with the chart 35 may indicate the upper level to which the liquid will reach before the control action starts. The sector 71 is provided with an indicator 75 that also cooperates with the chart to indicate the lower level to which the liquid may move before a control action is started.

From the above, it will be seen that the control instrument will operate to keep the valve 14 at some intermediate position as long as the level of the liquid in the tank stays between predetermined limits. If, however, the level should rise above or fall below these limits, a control action will be started to bring the liquid level back to normal. These limits may be varied within a wide range, or they may be reduced to zero. The use of an inactive neutral zone of this type means that the valve itself will not be continually oscillated as the level changes but will only be oscillated when the level of the liquid reaches some predetermined value.

Another form of the invention by which the same results can be accomplished is shown in Figure 6. In this embodiment the dead neutral is obtained by means of the parts adjacent the flapper and nozzle of the control unit 37 rather than by the construction of the parts adjacent the control point setting mechanism. To this end, only one differential lever 58 is used in place of two which were used in the previous embodiment. The upper end of a link 43A corresponding to link 43 of the previous embodiment is directly connected to the mid-point of the link 58 to be moved thereby as the link 60 is moved in response to changes in the level of the liquid. The lower end of link 43A is formed with a turned over edge 76 that receives a screw 77. This screw serves to adjust an abutment member 78 up and down along a slot 80 formed in the lower end of the link to vary the length of this slot. The right end of the flapper actuating lever 40 is formed with a pin 79 that is received in the slot 80. Lever 40 is normally biased in a counter-clockwise direction, by means of a weight 81 that is placed on its left arm, an amount that is limited by engagement of the right arm of the lever with a weighted lever 82. This latter lever is heavy enough to overcome the force of the weight 81 and serves to move the lever 40 in a clockwise direction to a point in which the lever 82 engages a stop 83 formed on the supporting member 84 for the lever 40.

In the operation of this embodiment, the weighted lever 82 tends to hold lever 40 in a position in which the pin 41 will hold flapper 39 in a position relative to nozzle 38 to cause the control instrument to supply an intermediate pressure to the control valve 14. As the link 43A moves upwardly, or downwardly due to a change in the level of the tank, nothing will happen as long as the ends of the slot 80 do not engage the pin 79. When, however, the liquid level has varied enough so that the link 43A is moved to bring one of the ends of slot 80 into engagement with pin 79, the lever 40 will be moved by this link to move the flapper 39 relative to nozzle 38, and thereby produce a control action. As the link 43A is moved upwardly, pin 79 will be engaged by abutment member 78 to move levers 40 and 82 in a counter-clockwise direction and as the link 43A is moved downwardly, the upper end of slot 80 will engage the pin 79 to move the lever 40 in a clockwise direction. Such action will vary the pressure applied to the control valve 14 to either increase or decrease this pressure whichever is required to bring the liquid level within the tank 11 back within the limits of the instrument.

In the above embodiments of the invention, we have described the control valve as held at some intermediate position when the liquid level in the tank was between two predetermined limits. It may be desirable at some times to open the control valve completely when the liquid level reaches the upper limit and to keep the valve open until such time as the liquid reaches the lower limit when the valve will be closed until the liquid again reaches the upper limit. A construction by which this can be performed is disclosed in Figure 7. This figure differs only slightly from that previously described as far as the control point setting mechanism is concerned, but is shown herein as actuating an electric rather than an air control. Such a construction is shown in Figure 7.

The lever 46A, which corresponds to the lever 46 in the previous embodiment, is pivoted at 85 and in this case is held in any position to which it is moved by means of frictional engagement between the left end of this lever and an arcuate friction plate 86. The link 43, which is moved as lever 46A as moved, serves to move a vane 87 that is provided on the lever 88 which is pivoted at 89. This lever is provided with a counterweight 90 that is sufficient to statically balance the lever and vane. The vane and lever are moved by the link 43 through the connecting means consisting of a pin 91 that is received by a slot 93 in the lever 88. Pin 91 is on the end of a lever 92 that is pivoted at 94, and is moved around its pivot by means of a connecting link 95 that extends between the lever and link 43. The lever 92 is also provided with a counterweight 96 that serves to balance this lever.

The vane 87 is provided with one edge having a large radius 97 and a small radius 98 which are connected by an inclined surface 99. The movement of the vane around its pivot serves to operate a switch 100 shown herein as being a mercury switch that is supported on a member 101 that is pivoted at 102 and is moved around its pivot by means of a lever 103 having a roller 104 on its outer end which engages the edge of the vane. This lever and switch are normally biased in a clockwise direction by means of a spring 105 to a position which is limited by engagement between the lever 103 and the edge of the vane 87. The switch 100 is used to control the operation of a solenoid valve 14A that is energized, when the switch is closed, from a source of current shown herein as a battery 107.

In the operation of this embodiment of the invention, it may be assumed for purposes of description that the liquid level has reached its lowest point, the switch 100 has been opened and the valve 14A has been closed. Thereafter, as the level of the liquid in the tank 11 increases, the shaft 33 will be moved in a counter-clockwise direction to lower the left ends of differential levers 58 and 60. The lever 46A will remain in the position in which it was last moved as the pin 57 recedes from it. When the pin 57 has moved downwardly enough to engage the upper surface of projection 59, the lever 46A and link 43 will be moved in a direction to rotate a lever 92 clockwise. This will move pin 91 in slot 93 to turn the vane in a counter-clockwise direction, thereby bringing the low portion 98 of the vane underneath roller 104. This action serves to permit the switch 100 to close by the action of spring 105 by moving the switch so that its right end is lower than its left end. This closes the circuit including the switch 100, battery 107 and valve 14A to energize this valve and open the same. Liquid will then begin to flow from the tank 11.

As the liquid flows from the tank, the level in the tank will be lowered and the movement of the lever 61 and differential levers 58 and 60 will be reversed. The remaining structure will stay in the position to which it has been moved, however, due to the frictional engagement between lever 46A and plate 86. This state of affairs will continue until the liquid level has dropped to a point where the pin 57 will engage the lower edge of the projection 59 and move lever 46A and link 43 upwardly. This operation will continue until the vane 87 has been moved so that its surface 97 will be under roller 104, thereby opening switch 100 and deenergizing the valve 14A to close the outlet pipe 13. This operation will be repeated as the liquid level in the tank reaches one or the other of its limits.

The embodiment of the invention of Figure 7 has been described as operating an electric control instead of a pneumatic control to show the versatility of the applicants' invention. It should be perfectly obvious, however, that in this embodiment, the lower end of the link 43 could be attached to the lever 46 as was the case in Figure 1 to operate the flapper 39. In this case, the flapper would be moved to one or the other of its limits to increase the air pressure applied to valve 14 to a maximum or decrease it to a minimum, whereby the valve will close or open respectively, depending upon the level of the liquid in the tank 11.

In some cases it may be desirable to have the inactive neutral type of controller which was described in connection with Figure 3 operate an electrically driven valve rather than an air operated valve as was described above. To this end, the arrangement shown in Figure 3 could be used to operate a vane 87 of the type disclosed in Figure 7. When this is done, the vane would normally be biased to a position in which the roller 104 is normally in engagement with the surface 99 of the vane as shown in Figure 8. When an apparatus of this type is used it will generally be convenient to use a motor driven valve 14B that is driven by means of motor 109 acting through a pinion 110 to operate the valve in one direction or the other depending upon the direction in which the motor is rotated. This motor is energized for rotation in one direction or the opposite direction as the contacts in one end or the opposite end or a mercury switch 100 are closed. If, for example, the level of the liquid is between the limits for which the instrument is adjusted, the parts will assume the position shown in Figure 8, in which roller 104 is an engagement with the inclined portion 99 of vane 87 with the mercury switch 100 in a position in which both sets of contacts are open. The motor 109 is at that time deenergized, and the valve is held in the position which it assumed when the motor was stopped. If the level of the liquid in the tank should rise above or fall below the limits for which the instrument is adjusted, the vane will be moved so that the roller 104 will engage either surface 98 or 97 of the vane, thereby closing the contacts in one end or the opposite end of the switch 100. In such a case, the motor 109 will be energized to rotate in one direction or the other to properly adjust the valve 14B. With the construction shown, the valve 14B will stay in the position to which it had been adjusted when the vane 87 returned to its midposition to open switch 108 and deenergize motor 109. The valve 14B may or may not be in one of the limits of its travel depending upon the amount it was adjusted before the liquid level returned to a point between the limits for which the instrument is adjusted. The valve will remain in this position until the switch 108 is again closed.

From the above description, it will be seen that we have provided a control apparatus in which either an air or an electrical control instrument may be used with an inactive neutral position that is variable in width, or with an overlapping neutral position that is also variable in width. This apparatus is simple in construction, and is positive in operation.

While in accordance with the provisions of the statutes, we have illustrated and described the best form of our invention now known to us, it will be apparent to those skilled in the art that certain changes may be made in the form of the apparatus disclosed without departing from the spirit of our invention as set forth in the appended claims, and that certain features of our invention may sometimes be used to advantage without a corresponding use of other features.

Having now described our invention, what we claim as new and desire to secure by Letters Patent is:

1. In a control instrument, a pair of operating levers each pivoted at one end to individual supports, means to simultaneously move the opposite ends of said levers in response to variations in a condition, and an actuating member having portions extending into the paths of said levers whereby said member will be moved in one direction by one lever and in the opposite direction by the other as said levers are moved by said moving means.

2. In a control instrument, a pair of levers each having one end pivoted to individual supports, a driving pin on each lever, means to simultaneously move the opposite ends of said levers in response to variations in a condition to thereby move each of said driving pins through a path, and a pivoted actuating member having on one end a pair of projections with each projection in the path of one of said driving pins, one driving pin being on one side of one projection and the other driving pin being on the opposite side of the other projection whereby said member will be moved in one direction or in the opposite direction as said element moves said levers as the condition varies in value.

3. In a control instrument, a pair of levers each pivoted at one end, a driving portion on each lever, means to simultaneously move the opposite ends of each lever through a path in response to variations in the value of a condition whereby said driving portions will each be moved through a path, means to individually adjust the pivoted ends of said levers to change the paths through which said driving portions are moved, and a driven member having a driven portion thereon in the path of each driving portion whereby said member will be moved as said condition varies.

4. In a control instrument, a pair of levers each having driving portions thereon and each pivoted to move around a pivot, means to simultaneously move said levers around their pivots in response to variations in a condition, an actuating member having driven portions thereon, each lying in the path of one of said driving portions, and means to bias said member to a neutral position in which said driven portions are between said driving portions whereby as said levers are moved said member will be moved in opposite directions from its neutral position.

5. In a control instrument, a pair of levers each having a driving portion and each being pivoted to move about an adjustable support, means to move said levers about their supports in response to variations in a condition whereby said driving portions will each be moved through a path depending upon the positions of said supports, an actuating member having a pair of driven portions each located in the path of one of said driving portions to be engaged by the latter as it moves, and means to bias said member to a neutral position in which said driven portions are not normally engaged by said driving portions.

6. In a control instrument, an element moved to different positions depending upon the value of a condition, a pair of levers, an adjustable support for each lever and about which it is pivoted, each lever having a driving portion, means to move said levers about their supports by said element whereby said driving portions will each be moved through a path, a pivoted actuating member having a pair of driven portions each of which is in the path of one of said driving portions to be moved by the latter as said levers move, means to frictionally hold said member in any position in which it has been moved, and control mechanism operated by said member and in accordance with the position of the latter.

7. In a control instrument, the combination of an element movable to various positions depending upon the value of a condition, a pair of levers each having a driving portion, adjustable fulcrum supports for said levers, means to move each of said levers by said element as the latter moves, a pivoted actuating member, driven portions on said actuating member, one in the path of movement of each driving portion whereby said member will be moved by said levers as the driving portions engage their respective driven portions, means to frictionally hold said member in the position in which it has been moved when a driving portion moves out of engagement with its driven portion, and a control mechanism operated by said member in accordance with the position of the latter.

8. In an air control instrument, an element movable to various positions in accordance with the value of a condition to be controlled, air control mechanism operative to vary the pressure of a supply of air through a given range, means to adjust said mechanism to supply air normally at a pressure intermediate the ends of said range, and means operated by said element to adjust said mechanism to supply air at a pressure above or below said intermediate pressure only when said condition varies to either side of a limited range within the range of operation of said instrument.

9. In an air control instrument the combination of an air control mechanism adapted to vary the pressure of a supply of air through a given range, a member to operate said mechanism to vary the air pressure, means to maintain normally said member in an intermediate position whereby said air pressure will be maintained at a value intermediate the limits of its range, an element moved to positions proportional to the value of a condition to be controlled, means operated by said element to move said member from its intermediate position, said last means including a pair of parts to engage said member, one part to engage said member upon movement of said element in one direction and the other part to engage said element upon movement in the opposite direction, and means to vary the normal distance between said parts.

10. In an air control instrument, the combination of an element movable between given maximum limits as a condition being measured varies from a maximum to a minimum value, an air control mechanism to vary the pressure of a supply of air through a given range, a member to adjust said mechanism, said member being normally operative to adjust said mechanism to supply a given pressure intermediate the limits of said range, and means operated by said element to adjust said member when said element moves beyond the limits of an intermediate portion of said maximum limits of operation of said element.

11. A system to control the level of liquid in a container comprising, means to measure the level of the liquid in the container, an element continuously operated thereby as the liquid level changes, control mechanism, means operated by said element when the liquid level drops below a given point to adjust said mechanism to increase the liquid level, means operated by said element when the liquid level rises above a given point above said previously mentioned given point to reduce the liquid level, and means to maintain said control mechanism at an intermediate adjustment when the liquid level is intermediate said given points.

12. A system to control the level of liquid in a container comprising, means to measure the level of the liquid in the container, an element continuously operated thereby as the liquid level changes, control mechanism, means operated by said element when the liquid level drops below a given point to adjust said mechanism to increase the liquid level, means operated by said element when the liquid level rises above a given point above said previously mentioned given point to reduce the liquid level, means to maintain said control mechanism at an intermediate adjustment when the liquid level is between said given points, and means to vary the height of said given points in said container.

13. In a control instrument, control mechanism operative through a given range, an element movable through a path of travel dependent upon the variation in the value of a condition, a member to operate said mechanism, means to operate said member normally to a given point intermediate the limits of its range, means to move said member by said element to shift said member to one side of said given point as said element moves beyond a predetermined limited range in its path of travel due to condition variations.

14. In a control instrument having an element movable through a path depending upon the value of a variable condition and having a control unit operated by said element, the combination of means to operate the unit by the element comprising a pair of pivoted levers, individually adjustable supports for one end of each of said levers, a member operatively connected to the opposite ends of said levers and moved by the element, a pivoted actuating member operative to adjust the control unit, means to drive said actuating member from said levers comprising a driving part on each lever, a driven part on said actuating member for cooperation with each of said driving parts in one direction of movement of the latter, and means to adjust the position of said supports to vary the relative positions of said driving and driven parts.

LOUIS GESS.
EDWIN C. BURDICE.